US010897653B2

(12) United States Patent
Stetson, Jr. et al.

(10) Patent No.: US 10,897,653 B2
(45) Date of Patent: Jan. 19, 2021

(54) POWER PASSING TERMINATION TAP

(71) Applicant: PCT International, Inc., Mesa, AZ (US)

(72) Inventors: Richard H. Stetson, Jr., Sautee, GA (US); Kang Lin, Chandler, AZ (US)

(73) Assignee: PCT International, Inc.

( * ) Notice: Subject to any disclaimer, the term of this patent is extended or adjusted under 35 U.S.C. 154(b) by 167 days.

(21) Appl. No.: 16/203,826

(22) Filed: Nov. 29, 2018

(65) Prior Publication Data
US 2019/0166406 A1  May 30, 2019

Related U.S. Application Data

(60) Provisional application No. 62/591,887, filed on Nov. 29, 2017.

(51) Int. Cl.
| H04N 21/61 | (2011.01) |
| H04N 5/38 | (2006.01) |
| H04H 20/78 | (2008.01) |
| H04N 7/10 | (2006.01) |

(52) U.S. Cl.
CPC .......... *H04N 21/615* (2013.01); *H04H 20/78* (2013.01); *H04N 5/38* (2013.01); *H04N 7/104* (2013.01); *H04N 21/6118* (2013.01); *H04N 21/6168* (2013.01)

(58) Field of Classification Search
None
See application file for complete search history.

(56) References Cited

U.S. PATENT DOCUMENTS

| 3,671,885 | A | * | 6/1972 | Pennypacker | H03H 7/48 333/131 |
| 4,408,353 | A | * | 10/1983 | Bowen | H04L 12/40045 358/901.1 |
| 5,642,155 | A | * | 6/1997 | Cheng | H04N 7/17309 348/E7.07 |
| 5,905,941 | A | * | 5/1999 | Chanteau | H04N 7/10 348/E7.049 |
| 6,393,607 | B1 | * | 5/2002 | Hughes | H03H 7/482 333/126 |
| 6,486,644 | B1 | * | 11/2002 | Nemirow | H02M 3/33523 323/285 |
| 7,043,750 | B2 | * | 5/2006 | Ina | H03H 7/46 348/E7.052 |

(Continued)

*Primary Examiner* — Fernando Alcon
(74) *Attorney, Agent, or Firm* — Thomas W. Galvani, P.C.; Thomas W. Galvani

(57) ABSTRACT

A tap has an input, an output, and first and second tap outputs. A first transmission line extends between the input and the output and includes a low-pass filter. A second transmission line extends between the input and a switch, and includes a directional coupler and a first high-pass filter. An AC/DC converter is coupled to the first transmission line to operate the switch between open and closed conditions, in response to existence and absence of power in the first transmission line, respectively. In the open condition of the switch, the second transmission line is coupled to a resistor and a ground. In the closed condition of the switch, the second transmission line is coupled to a second high-pass filter and the output. A splitter is coupled between the directional coupler and the first and second tap outputs.

2 Claims, 2 Drawing Sheets

(56) References Cited

U.S. PATENT DOCUMENTS

| | | |
|---|---|---|
| 9,363,469 B2 | 6/2016 | Wells |
| 9,554,194 B2 | 1/2017 | Wachob et al. |
| 9,923,319 B2 | 3/2018 | Ariesen et al. |
| 9,930,421 B2 | 3/2018 | Wachob et al. |
| 10,050,328 B2 | 8/2018 | Rijssemus et al. |
| 10,103,420 B2 | 10/2018 | Boskaljon et al. |
| 10,237,626 B2* | 3/2019 | Wachob ............. H04N 21/6118 |
| 2005/0210529 A1* | 9/2005 | Pavlic .................... H03H 11/36 |
| | | 725/127 |
| 2014/0282783 A1* | 9/2014 | Totten .............. H04B 10/25751 |
| | | 725/111 |
| 2014/0380400 A1 | 12/2014 | Wachob et al. |
| 2015/0236460 A1 | 8/2015 | Ariesen et al. |
| 2017/0118527 A1 | 4/2017 | Wachob et al. |
| 2017/0155182 A1 | 6/2017 | Rijssemus et al. |
| 2017/0201001 A1 | 7/2017 | Boskaljon et al. |
| 2018/0020261 A1 | 1/2018 | Wachob et al. |
| 2018/0254453 A1 | 9/2018 | Palawinna et al. |
| 2019/0014286 A1* | 1/2019 | Alkan ................ H04N 21/6118 |
| 2019/0222800 A1* | 7/2019 | Bailey ................... H04H 20/63 |

\* cited by examiner

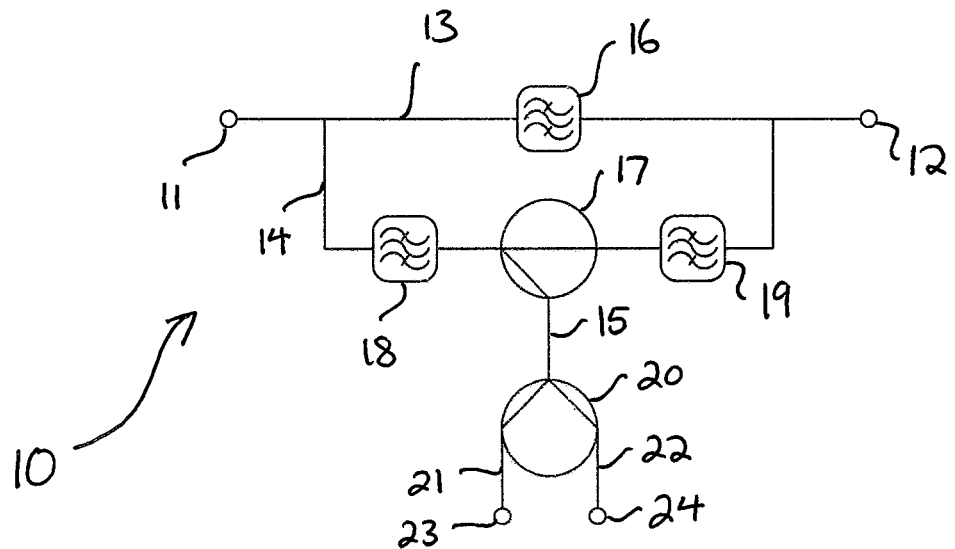
FIG. 1 – Prior Art
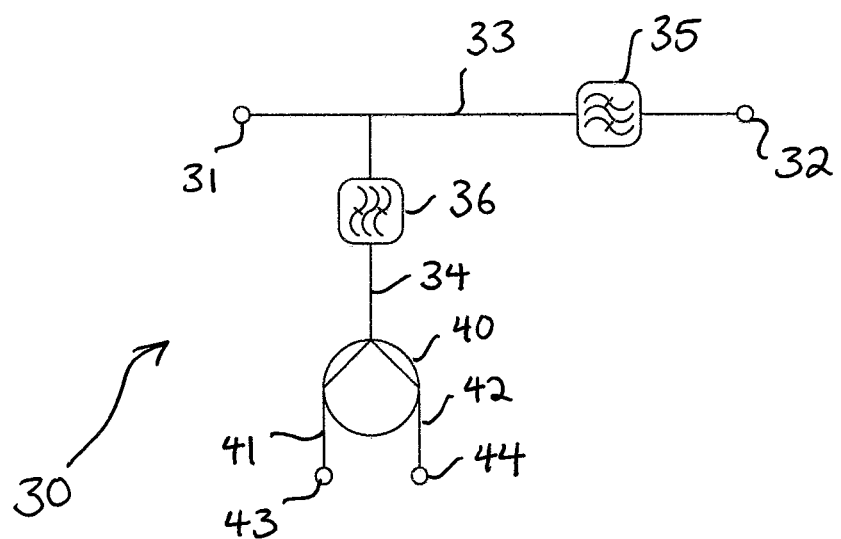
FIG. 2

US 10,897,653 B2

POWER PASSING TERMINATION TAP

CROSS-REFERENCE TO RELATED APPLICATIONS

This application claims the benefit of U.S. Provisional Application No. 62/591,887, filed Nov. 29, 2017, which is hereby incorporated by reference.

FIELD OF THE INVENTION

The present invention relates generally to telecommunication equipment, and more particularly to taps for use in hybrid fiber-coaxial architectures.

BACKGROUND OF THE INVENTION

Radio frequency ("RF") communications, such as cable TV ("CATV") and internet services, are delivered to subscribers through lines and cables. Since the early 1970s, cable operators have deployed distribution coaxial cable connecting amplifiers and taps to deliver these services. Amplifiers add power to a transmitted signal so that signal can be transmitted further downstream; amplifiers are frequently cascaded up to 32 deep. Taps are used to extract the RF signal from the transmitted signal; a drop line will extend off a tap and drop down to a subscriber's premises, such as a condominium, office, or home. The tap also allows the transmitted signal to continue to pass along the main line to other taps, until the signal needs to be boosted by an amplifier or simply terminated. Low voltage AC power also drops down through the tap to power amplifiers or customer premises equipment. Taps have conventionally been used to pass both RF and AC combined.

Since the early 1990s, cable operators have been moving toward hybrid fiber-coaxial ("HFC") architecture in which a fiber optic line runs from an upstream source, such as the plant, to a downstream local node. At the node, the fiber optic line is coupled to coaxial cables which eventually connect individual subscribers to RF services. When powered, the node converts the optical light into an RF signal capable of being carried by the coaxial cable. A typical fiber node can feed around 1000 customers. This usually required about 35 amplifiers, which reduced node density considerably.

In HFC architecture, taps would still provide RF signals to customers and would also continue to provide both RF and AC combined to downstream amplifiers. Now, however, fiber is being built even deeper to the customers. In what is called N+0 architecture, there are no amplifiers in a cascade. In many cases, fiber optic runs directly to an optical node which then feeds between four and six taps without amplification. In other words, where there were once additional amplifiers, now there are only optical nodes.

These optical nodes require AC power that was once present in the line. The conventional solution has been to splice a power inserter into the coaxial line to provide power to the node. This required terminating the RF signal to the optical node; failure to terminate the signal would allow it to mix with the transmitted signal, resulting in poor signal quality. There is a need for providing power to an optical node without an additional power device and without passing the RF signal to the node.

SUMMARY OF THE INVENTION

In an embodiment, a tap includes an input, an output, and first and second tap outputs. A first transmission line extends between the input and the output, and it includes a low-pass filter for removing high frequencies from a first signal in the first transmission line. A second transmission line extends between the input and a splitter coupled to the first and second tap outputs, and it includes only a high-pass filter for removing low frequencies from a second signal in the second transmission line. The high-pass filter is upstream from the splitter.

In another embodiment, a tap includes an input, an output, and first and second tap outputs. A first transmission line extends between the input and the output, and it includes a low-pass filter for removing high frequencies from a first signal in the first transmission line. A second transmission line extends between the input and a switch, and it includes a directional coupler and a first high-pass filter for removing low frequencies from a second signal in the second transmission line. An AC/DC converter is coupled to the first transmission line to operate the switch between open and closed conditions, in response to existence and absence of power in the first transmission line, respectively. In the open condition of the switch, the second transmission line is coupled to a resistor and a ground. In the closed condition of the switch, the second transmission line is coupled to a second high-pass filter and the output. A splitter is coupled between the directional coupler and the first and second tap outputs.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings:

FIG. 1 is a circuit diagram of a prior art tap;

FIG. 2 is a circuit diagram of an embodiment of a power passing termination tap.

DETAILED DESCRIPTION

Figure 3:
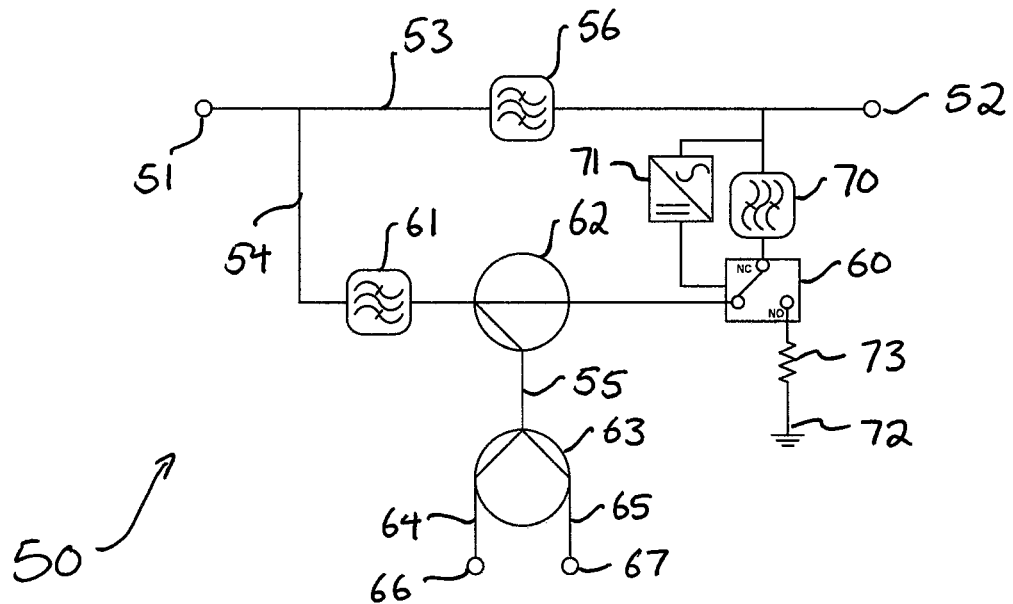
FIGS. 3 and 4 are circuit diagrams of an embodiment of a power passing termination tap with a switch in a closed condition and an open condition, respectively.

Reference now is made to the drawings, in which the same reference characters are used throughout the different figures to designate the same elements. FIG. 1 is a circuit diagram illustrating a conventional two-way tap 10. The tap 10 includes an input 11 and an output 12, a first transmission line 13, a second transmission line 14, and a third transmission line 15. The first transmission line 13 directly connects the input 11 to the output 12 and includes a low-pass filter 16. The low-pass filter 16 filters high-frequency signals, thereby passing only the AC signal between the input 11 and the output 12, and blocking the RF signals therebetween.

The second transmission line 14 connects the input 11 to the output 12 but branches into the third transmission line 15 as well. The second transmission line 14 includes a directional coupler 17 from which the third transmission line 15 extends. The directional coupler 17 is configured to accept upstream signals from the third transmission line 15 and pass them only toward the input 11, not the output 12. High-pass filters 18 and 19 are on the second transmission line 14 on either side of the directional coupler 17. The high-pass filters 18 and 19 each pass high-frequency signals, such as the RF signal, and block low-frequency signals such as AC power. As such, the RF signal may be transmitted from the input 11 to the output 12 through the directional coupler and may be transmitted up from the third transmission line 15 to the input 11.

The third transmission line 15 includes a splitter 20 branching into two lines 21 and 22 terminating at tap outputs 23 and 24, respectively. From the tap outputs 23 and 24, drop lines extend to customer premises.

FIG. 2 is a circuit diagram illustrating a power passing termination tap 30. The tap 30 includes an input 31 and an output 32, a first transmission line 33, and a second transmission line 34. The first transmission line 33 directly connects the input 31 to the output 32 and includes a low-pass filter 35. The low-pass filter 35 filters out high-frequency signals, such as RF communication frequencies, thereby passing only the AC signal between the input 31 and the output 32.

The second transmission line 34 extends from the first transmission line 33 upstream from the low-pass filter 35. The second transmission line 34 extends between the first transmission line 33 and a splitter 40 and includes a high-pass filter 36 upstream from the splitter 40. The high-pass filter 36 filters low-frequency signals, thereby passing only the RF signal between the input 31 and the splitter 40 and blocking the AC signal to the splitter 40. The splitter 40 branches into two lines 41 and 42 which terminate at tap outputs 43 and 44, respectively. From those tap output 43 and 44, drop lines are connected to couple the termination tap 30 to customer premises. With the termination tap 30, power can thus be transmitted between the input 31 and output 32 to power an optical node connected to the tap 30, without RF signals also coming through the first transmission line 33.

FIG. 3 is a circuit diagram illustrating an alternate embodiment of a power passing termination tap 50. The tap 50 includes an input 51 and an output 52, a first transmission line 53, a second transmission line 54, and a third transmission line 55. The first transmission line 53 extends from and directly connects the input 51 to the output 52 and includes a low-pass filter 56 therebetween to filter high-frequency signals, such as the RF signal, between the input 51 and output 52. The low-pass filter 56 allows the AC signal to transmit along the first transmission line 53.

The second transmission line 54 extends from the first transmission line 53 at the input 51 to an RF switch 60. The second transmission line 54 includes a high-pass filter 61 which filters low-frequency signals, such as the AC signal, and allows high-frequency signals, such as the RF signal, to transmit along the second transmission line 54. The second transmission line 54 further includes a directional coupler 62 from which the third transmission line 55 extends. The directional coupler 62 splits the RF signal to the output 52 and also to the third transmission line 55. The directional coupler 62 is configured to accept upstream signals from the third transmission line 55 and pass them only toward the input 51, not the switch 60.

The third transmission line 55 extends from the directional coupler 62 to a splitter 63. The splitter 63 branches into two lines 64 and 65 which terminate in tap outputs 66 and 67, respectively. From those tap outputs 66 and 67, drop lines are connected to couple the termination tap 50 to customer premises.

The second transmission line 54 extends from the directional coupler 62 to the switch 60. The switch 60 is coupled to the output 52 with a high-pass filter 70 and a parallel AC/DC converter 71. The switch 60 has a normally open condition and a normally closed condition. In the normally open condition, the switch 60 couples the second transmission line 54 to ground 72 to terminate the RF signal. In the normally closed condition, the switch 60 couples the second transmission line 54 to the high-pass filter 70. That high-pass filter 70 filters low-frequency signals, such as the AC signal, so that only the RF signal is transmitted between the output 52 and the second transmission line 54.

Figure 4:
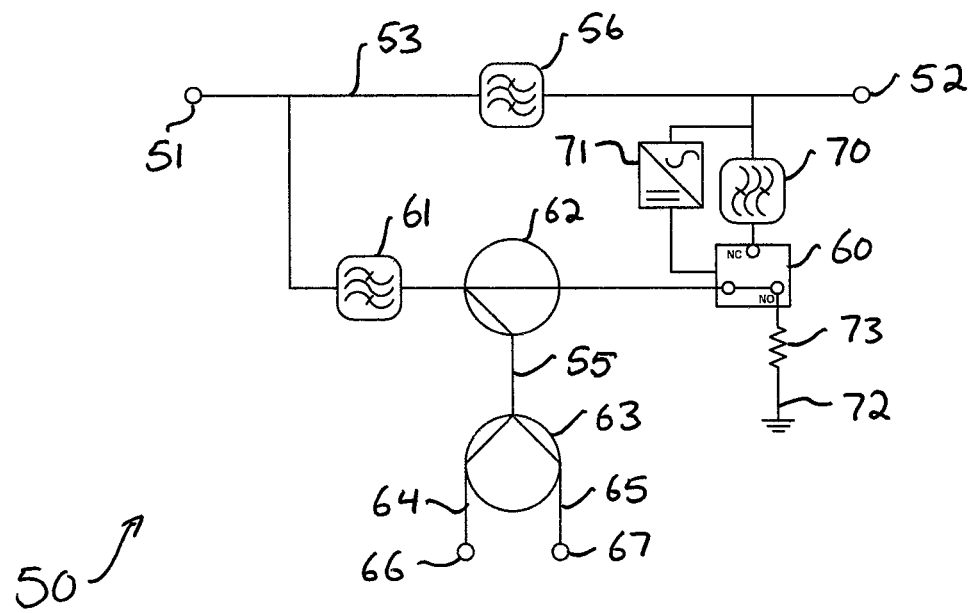

The switch 60 is powered by the AC/DC converter 71. The AC/DC converter 71 receives AC power from the input 51, through the low-pass filter 56, and converts it to DC power, which it provides to the switch 60. In other words, the AC/DC converter 71 is coupled to the first transmission line 53 to operate the switch 60 between normally open and closed conditions in response to the existence or absence of power in the first transmission line 53. When AC power is not provided to the tap 50 at the input 51, the switch 60 is set to the normally closed ("NC") condition, as shown in FIG. 3. RF signals are passed from the input 51 to the output 52 through the high-pass filter 61, the directional coupler 62, the switch 60, and the other high-pass filter 70. When AC power is provided to the tap 50 at the input 51, the switch 60 operates to the normally open ("NO") condition, as shown in FIG. 4. There, RF signals are passed from the input 51, through the high-pass filter 61, through the directional coupler 62, into the switch 60, and then through a 75 Ohm resistor 73 to ground 72. In this situation, the output port 52 only passes AC power from the input port 51 and the low-pass filter 56.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

The invention claimed is:

1. A tap comprising:
   an input, an output, and first and second tap outputs;
   a first transmission line extending between the input and the output, the first transmission line including a low-pass filter for removing high frequencies from a first signal in the first transmission line; and
   a second transmission line extending between the input and a splitter coupled to the first and second tap outputs, the splitter simultaneously coupling the input to the first and second tap outputs in electrical contact and communication, and the second transmission line including only a high-pass filter for removing low frequencies from a second signal in the second transmission line, wherein the high-pass filter is upstream from the splitter.

2. A tap comprising:
   an input, an output, and first and second tap outputs;
   a first transmission line extending between the input and the output, the first transmission line including a low-pass filter for removing high frequencies from a first signal in the first transmission line;
   a second transmission line extending between the input and a switch, the second transmission line including a directional coupler and a first high-pass filter for removing low frequencies from a second signal in the second transmission line;
   an AC/DC converter coupled to the first transmission line to operate the switch between open and closed conditions, in response to existence and absence of power in the first transmission line, respectively, wherein in the open condition of the switch, the second transmission line is coupled to a resistor and a ground, and in the closed condition of the switch, the second transmission line is coupled to a second high-pass filter and the output; and a splitter is coupled between the directional coupler and the first and second tap outputs.

* * * * *